United States Patent [19]
Hudson

[11] 3,810,650
[45] May 14, 1974

[54] ANTI-DIVE BANKING SUSPENSION APPARATUS FOR VEHICLES

[76] Inventor: Norman H. Hudson, 805 Franklin Rd., Clinton, Miss. 39056

[22] Filed: May 3, 1972

[21] Appl. No.: 249,777

[52] U.S. Cl. .............................. 280/124 F, 267/34
[51] Int. Cl. ............................................ B60g 11/58
[58] Field of Search ................. 267/34, 65 R, 65 D; 280/124 F

[56] References Cited
UNITED STATES PATENTS
| | | | |
|---|---|---|---|
| 3,603,574 | 9/1971 | Lutz | 267/34 |
| 3,173,671 | 3/1965 | Broadwell | 280/124 F |
| 2,320,314 | 5/1943 | Trask | 267/34 |

Primary Examiner—Philip Goodman
Attorney, Agent, or Firm—Scrivener, Parker, Scrivener & Clarke

[57] ABSTRACT

Apparatus for maintaining a vehicle body in substantially level condition and absorbing shock has pistons mounted respectively on the body and the axle and relatively movable with respect to each other. A cylinder is connected to the body-attached piston and provides a cylinder for the axle-attached piston, but does not engage the axle. The axle-connected piston has a central bore within which there is a smaller floating piston. The two axle-connected pistons have a combined area equal to that of the body-connected piston. The space between the body-connected piston and the two axle-connected pistons is filled with oil, and the inner of the axle-connected pistons is suspended within the outer piston between oil on its upper surface and air pressure on its lower surface.

4 Claims, 3 Drawing Figures

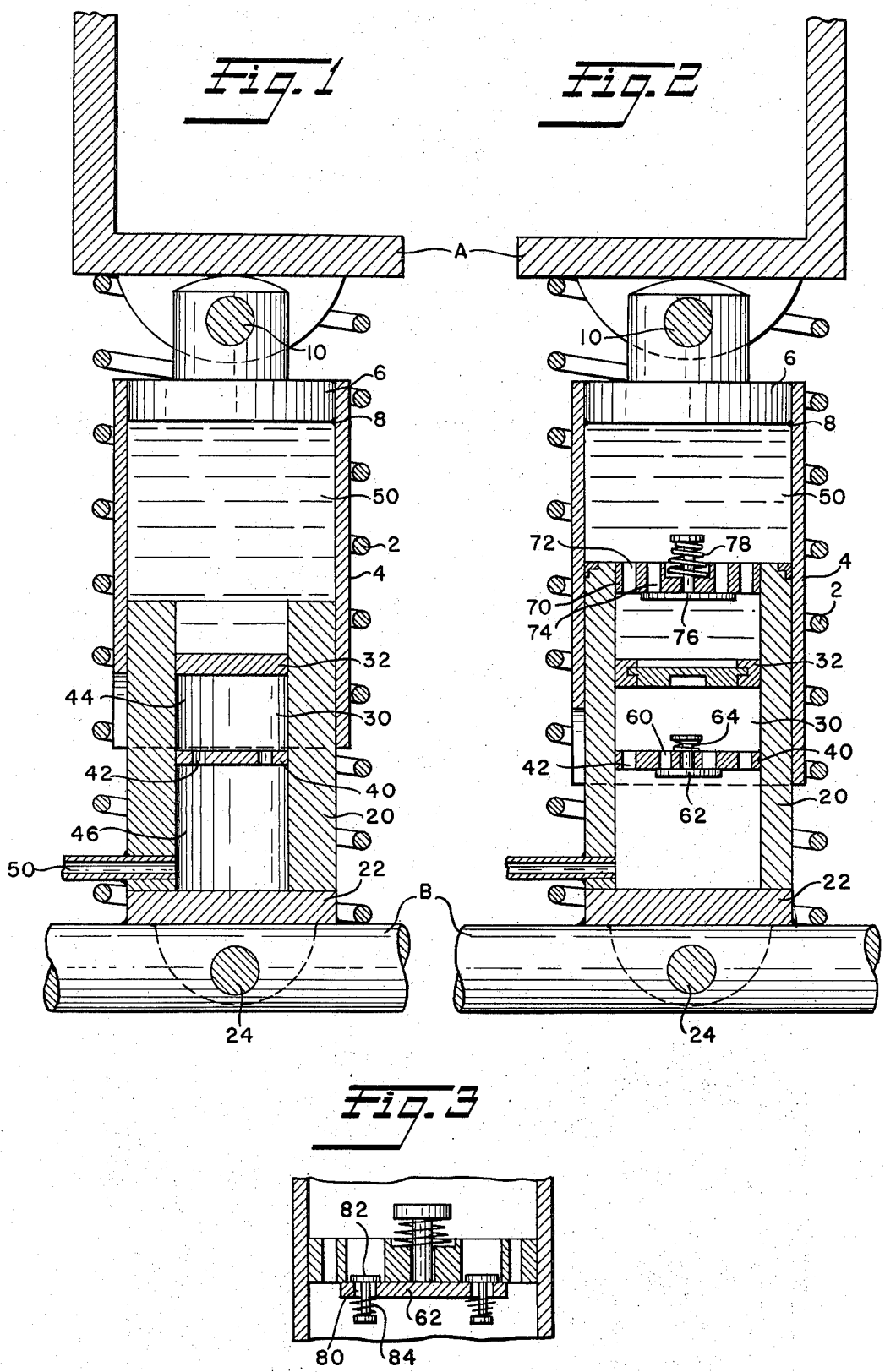

ANTI-DIVE BANKING SUSPENSION APPARATUS FOR VEHICLES

SUMMARY OF THE INVENTION

The apparatus provided by the invention is positioned between the body and the axle of a vehicle and, while not a typical shock absorber, dampens the movement of the body with respect to that of the axle.

DESCRIPTION OF THE DRAWINGS

FIG. 1 is a longitudinal sectional view of apparatus provided by the invention, being shown positioned between the body and axle of a vehicle;

FIG. 2 is a view which is similar to FIG. 1 and shows a modified form of the invention, and FIG. 3 shows a modified form of valve system for the lower stop for the inner axle-connected piston.

DESCRIPTION OF THE INVENTION

The basic form of the anti-dive banking suspension apparatus provided by the invention is disclosed in FIG. 1 of the drawings and is shown in association with the body A and an axle B of a vehicle of any type such as an automobile. In this specification the invention will be described in connection with an automobile and four of the suspension devices provided by the invention are preferably used in such a vehicle, being disposed at each of the four corners of the body B, two being between the body and the front axle and two between the body and the rear axle.

Each suspension device comprises a compression spring 2 the axis of which is vertical and the ends of which respectively engage the body B and the axle C, the spring being compressed between these parts by the weight of the body. A vertical cylinder 4 is disposed concentrically within the spring and is shorter than the distance between the body and the axle when spring 2 is compressed, its upper and lower ends being spaced, respectively, from the body and axle.

The upper end of cylinder 4 is closed by a circular member 6 which is welded at its periphery to the inner wall of the cylinder as shown at 8. At its upper surface the closure member 6 is pivotally connected to the body A by pin 10.

Within the lower part of cylinder 4 there is slidably mounted a cup-shaped piston 20 the bottom of which is pivotally connected to axle B by pin 24. The piston 20 is of such cross sectional shape and size that its outer cylindrical surface slidingly engages the inner peripheral wall of cylinder 4 for axial movement therein. Piston 20 is centrally and concentrically bored to provide a cylindrical chamber 30, the lower end of which, adjacent axle B, is closed by the bottom 22 of the cup-shaped piston 20. Within chamber 30 and mounted for axial movement therein is a piston 32 which is of small axial extent with respect to the axial length of chamber 30 and which is of such cross sectional shape and size that its outer cylindrical surface slidingly engages the inner peripheral wall of chamber 30 for axial movement therein. A stop member 40 is disposed within chamber 30 below piston 32 and is fixedly connected at its periphery to the inner wall of cylinder 30, as by welding. This stop has ports 42 extending through it to provide communication between the chambers 44, 46 at its upper and lower sides, respectively. The chambers 44, 46 above and below the stop member 40, respectively, are supplied with air under pressure through tube 50 and the ports 42 in stop member 40.

The lower piston 20 extends upwardly from the axle a substantial distance, which is approximately half way, into cylinder 4 and it will therefore be seen that the lower surface of the upper closure member 6 faces the annular upper surface of the lower, outer piston 20 and the central cylindrical chamber therein, and is spaced axially therefrom. It will be apparent that because of the constant cross section of the interior of cylinder 4 the area of the lower surface of the upper closure member 6 is equal to that of the annular outer lower piston 20 plus that of the circular inner piston 32. In further accordance with the invention the area of the upper end of the lower piston 20 is equal to, or greater than, that of inner piston 32, and in further accordance with the invention the space 50 between the lower surface of the upper closure member 6 and the upper surfaces of the lower pistons 20 and 32, including the space within the chamber 30 above the inner lower piston 32, is filled completely with oil.

Means are also provided by the invention for accommodating the action of the suspension device to sudden or severe relative movements between the body and axle, and such means are embodied in the preferred form of the invention which is disclosed in FIG. 2 of the drawings, in which corresponding parts are designated by the same reference numerals as are used in FIG. 1. In this embodiment the stop member 40 which is in fixed position below the movable inner piston 32 is provided with centrally located ports 60 which extend therethrough and which are additional to the ports 42 which are disclosed in FIG. 1 and described above. These supplemental ports 60 are normally closed by a plate 62 which engages the lower surface of the stop member and which has a stem extending slidably upwardly through the stop member and having an abutment at its upper end spaced above the upper surface of the stop member. A spring 64 surrounds the stem and bears at its ends on the abutment and the upper surface of the stop member to urge the plate 62 into position closing the ports 60. At this point in the operation the floating piston 32 is vertically midway between stop member 40 and the upper end of outer piston 20.

If, while the vehicle is moving, a wheel is raised by any obstruction, for example, by a distance of 4 inches, the adjacent axle-connected lower, outer piston 20 will be raised a lesser distance, which may be 2 inches in the example being given, because the device is spaced a predetermined distance inboard of the wheel. This upward movement of piston 20 will displace oil from the central chamber 50, causing the inner piston 32 to move downwardly a distance which will be equal to the upward movement of piston 20 if the areas of pistons 20 and 32 are equal and they therefore displace equal volumes of oil in chamber 50. During these equal and opposite movements of pistons 20 and 32 the upper closure member 6 will remain substantially immobile as there will be no force to move it, because the oil displaced by the upward movement of piston 20 will be accommodated by the equal downward movement of piston 32 and the resistance of the upper closure member 6 to movement is greater than that of the lower inner piston 32 because of less pressure on the lower surface of piston 32. Downward movement of piston 32 is opposed by further compression of the air in chamber 44, and if the upward movement of the wheel is sufficient the piston 32 will be moved downwardly into engagement with stop 40, thus limiting the effect of the suspension device provided by the invention.

It may now be assumed that one side of the body, instead of the wheels, undergoes vertical downward movement with respect to the wheels, as occurs when the body leans from the vertical when rounding a curve at high speed. When this occurs the upper closure member 6 and its connected cylinder 4 will move downwardly while lower piston 20 will remain fixed. The oil in chamber 50 will therefore be displaced, forcing the lower inner piston 32 downwardly. Piston 20 cannot move downwardly as it is fixed to the axle, and piston 32 is therefore moved downwardly by the displaced oil against the pressure of air beneath it. The downward travel of closure member 6 will be less than that of piston 32 because the area of member 6 is greater than that of piston 32. If the body movement is sufficient the piston 32 will engage the stop 40 thus providing a positive stop to the downward movement of the body. Thus, the device provided by the invention acts as a stabilizer for the body.

The device of the preferred embodiment disclosed in FIG. 2 is operative in the same manner as that of FIG. 1, with the addition of the functions of the valves associated with the upper and lower stops for the inner piston 32, which operates to accommodate unusually large volumes of oil forced through the stops by abrupt movement of the body or axle. Thus, on any such unusual downward movement of the body with respect to the axle the sudden downward movement of the upper closure member 6 will abruptly increase the pressure of the oil in chamber 50, causing the oil to flow downwardly through supplemental ports 74 in upper stop member 70, pushing the valve plate 76 downwardly to open these ports, thus releasing the pressure on top of piston stop 70 and allowing excess oil that cannot move through orifices 72 to move quickly through openings 74, thereby releasing pressure in chamber 50 and thus preventing the transmission of shock to closure member 6 and the connected vehicle body. In the event of abrupt upward movement of the axle, the upward movement of outer lower piston 20 will have the same effect, depressing the valve plate 62, releasing the pressure in chamber 50, moving piston 32 quickly downwardly to relieve pressure from closure member 6 and the body. Further movement will engage piston 32 with lower stop 40 to stop further upward movement of the axle and associated parts.

In addition, in this preferred embodiment of the invention means are provided for controlling the passage of oil between chamber 50 and the inner chamber in cylinder 20 above the movable, inner piston 32. Such means comprise a stop member 70 positioned in and closing the chamber 20 above piston 32 and having open ports 72 therein which are adjacent its periphery and which provide for free flow of oil between chamber 50 and cylinder 20 above piston 32 in the normal operation of the device. In addition, the stop 70 is provided with one or more centrally located ports 74 which are normally closed by a plate 76 which engages the lower surface of the stop and which has a stem extending slidably upwardly through the stop and has an abutment at its upper end spaced above the upper surface of the stop. A spring 78 surrounds the stem and bears at its ends on the abutment and the upper surface of the stop to urge the plate 76 into position closing the ports 74.

In FIG. 3 of the drawings there is illustrated a modified form which may be taken by the upper and lower stop members 70 and 40 of FIG. 2 or by the lower stop member if no upper stop member is provided. As the modification is identical for the upper and lower stop members, it will be described only in connection with the lower stop member. In this modification the valve plate 62 is itself provided with two (the number is not critical) ports 80 each of which is normally closed by a plate 82 which bears on the upper surface of valve plate 62 and is resiliently held in this position by a spring 84 which bears at its one end on the lower surface of the valve plate and at its other end on an abutment on the lower end of a stem which extends downwardly from the valve plate through the associated port. These additional valves relieve excess pressure developed below either the upper or lower stop members 70 and 40 upon an excessively abrupt movement of the axle with respect to the body, as when a wheel drops into a hole.

OPERATION

As described above, it is assumed that one of the suspension devices is positioned at each of the four corners of an automobile, each being positioned a substantial distance inwardly of the adjacent wheel so that any vertical movement of that wheel will be translated through the axle to produce a smaller vertical movement of the adjacent axle-connected piston 20.

Air under pressure is now introduced through hose 50 to chamber 46, passing through ports 42 in lower stop member 40 to chamber 44 below the inner lower piston 32, raising the piston until its upward movement is stopped by the oil in central chamber 50, which occurs when the oil completely fills the chamber.

If the axle and its connected parts should move downwardly, moving piston 20 far enough, piston 32 would engage top piston stop 70 and the wheel and axle would reach the extent of the device downward movement. Orifices 72 would dampen wheel drop until the stop was engaged.

The valve 60, 62, 64 in the lower is opened on abrupt downward movement of the piston 32 when orifices 42 cannot handle the volume of air moved by piston 32 under any unusual movement to permit high pressure air to pass from chamber 44 to 46, thus creating a damping effect instead of shock to the system, and therefore to the body.

In the described operations of the device the spring 2 will compress and expand with relative movement of the body and wheels, but the cylinder 4 will undergo very little axial movement as it is connected to the large top piston and body. The cylinder 4 has no function in the operation of the device other than to provide a cylinder for piston 20 and as the oil chamber 50.

The suspension device permits the use of a limber spring, with a resultant "easy" ride, and stable relation of the body with respect to the wheels. This stability occurs during turns, bumps, jack-rabbit starts and other maneuvers during which relative movement otherwise would be excessive if a limber spring alone were used.

I claim:

1. A suspension device to be positioned between the body and a wheel axle of a vehicle, comprising a helical compression spring to be positioned and compressed between the body and axle, a cylinder positioned within and concentric with the spring but being shorter than the normal compressed length of the spring, a closure fixed in the body end of the cylinder and adapted to be connected to the body, a cylindrical piston adapted to be connected to the axle and extend upwardly into the cylinder for sliding axial movement therein and having a concentric chamber therein extending axially thereof, a piston within the chamber for sliding movement with respect to the axle-connected piston, the area of the end surface of the body-connected closure being equal to the sum of the areas of the end surfaces of the axle-connected piston and the piston within the chamber, means for introducing air under pressure below the piston in the chamber, and oil filling the main cylinder between the lower end surface of the body-connected closure and the upper end surfaces of the axle-connected piston and the piston within the chamber.

2. A suspension device according to claim 1, in which the area of the axle-connected piston is greater than that of the piston within the chamber.

3. A suspension device according to claim 1, in which the areas of the axle-connected piston and the piston within the chamber are equal.

4. A suspension device according to claim 1, in which the area of the axle-connected piston is less than that of the piston within the chamber.

* * * * *